United States Patent
Levy (10) Patent No.: US 9,031,789 B2
(45) Date of Patent: May 12, 2015

(54) SYSTEM AND METHOD FOR TESTING FLUID SEALS FOR LEAKS

(75) Inventor: David Levy, Broussard, LA (US)

(73) Assignee: Petrotechnologies, Inc., Broussard, LA (US)

( * ) Notice: Subject to any disclaimer, the term of this patent is extended or adjusted under 35 U.S.C. 154(b) by 824 days.

(21) Appl. No.: 13/315,118

(22) Filed: Dec. 8, 2011

(65) Prior Publication Data

US 2013/0073227 A1   Mar. 21, 2013

Related U.S. Application Data (63) Continuation-in-part of application No. 12/700,374, filed on Feb. 4, 2010, now Pat. No. 8,408,295, and a continuation-in-part of application No. 12/700,390, filed on Feb. 4, 2010, now Pat. No. 8,650,934, said application No. 12/700,374 is a continuation-in-part of application No. 12/248,558, filed on Oct. 9, 2008, now Pat. No. 8,037,933, and a continuation-in-part of application No. 11/766,541, filed on Jun. 21, 2007, now Pat. No. 7,784,838, said application No. 12/700,390 is a continuation-in-part of application No. 12/248,558, and a continuation-in-part of application No. 11/766,541.

(51) Int. Cl.
G01M 3/28 (2006.01)
E21B 47/117 (2012.01)
E21B 33/06 (2006.01)

(52) U.S. Cl.
CPC .......... *G01M 3/2846* (2013.01); *G01M 3/2853* (2013.01)

(58) Field of Classification Search
CPC ........... G01M 3/04; G01M 3/08; G01M 3/22; G01M 3/223; G01M 3/26; G01M 3/28; G01M 3/2846; G01M 3/2853; G01M 3/2869; G01M 3/2892; G01M 3/329; E21B 47/10; E21B 47/117; E21B 33/06; G06F 17/00; G06F 19/00
See application file for complete search history.

(56) References Cited

U.S. PATENT DOCUMENTS

| | | | |
|---|---|---|---|
| 5,201,212 A * | 4/1993 | Williams | 73/40.5 R |
| 5,526,679 A | 6/1996 | Filippi et al. | |
| 5,833,490 A | 11/1998 | Bouldin | |
| 5,883,815 A | 3/1999 | Drakutich et al. | |
| 6,056,327 A | 5/2000 | Bouldin et al. | |
| 6,101,452 A | 8/2000 | Krall et al. | |
| 6,269,683 B1 | 8/2001 | Jackson | |
| 7,032,935 B1 | 4/2006 | Levy | |
| 7,219,736 B1 | 5/2007 | Levy | |
| 7,784,838 B2 | 8/2010 | Levy | |
| 8,037,933 B1 | 10/2011 | Levy | |
| 2004/0098212 A1 | 5/2004 | Hong et al. | |
| 2007/0096465 A1 | 5/2007 | Hall et al. | |
| 2010/0280769 A1 | 11/2010 | Levy | |
| 2010/0280770 A1 | 11/2010 | Levy | |

* cited by examiner

*Primary Examiner* — Toan Le (74) *Attorney, Agent, or Firm* — Buskop Law Group, PC; Wendy Buskop (57) ABSTRACT

A system and method for testing a fluid seal in a device can include pumping fluid to the device and a control device simultaneously, while measuring the pressure of the fluid pumping to both devices. A change in volume of the fluid in the control device can be initiated, a change in pressure difference associated with the change in volume can be determined, and a leak test ratio can be formed therefrom. Changes in the pressure difference can be used to determine the presence of fluid leaks, which can be presented as test results to users connected to a network. A leak volume can be determined using the change in pressure difference and the leak test ratio.

20 Claims, 6 Drawing Sheets

SYSTEM AND METHOD FOR TESTING FLUID SEALS FOR LEAKS

CROSS REFERENCE TO RELATED APPLICATIONS

The present application is a continuation in part of U.S. patent application Ser. No.: 12/700,374 filed on Feb. 4, 2010, entitled "METHOD FOR TESTING CONNECTORS" and U.S. patent application Ser. No.: 12/700,390 filed on Feb. 4, 2010, entitled "TESTING SYSTEM FOR CONNECTORS", both of which are continuation in parts of U.S. patent application Ser. No. 12/248,558 filed on Jun. 21, 2007, entitled "High Pressure Energizable Tube Connector for a Well and Method of Energizing the Connector", which is now U.S. Pat. No. 7,784,838 issued on Oct. 18, 2011 and U.S. patent application Ser. No. 11/766,541 filed on Oct. 9, 2008, entitled "Externally Testable Redundant Seal Connector", which is now U.S. Pat. No. 8,037,933 issued on Aug. 31, 2010. These applications are incorporated in their entirety.

FIELD

The present embodiments generally relate to a system and method for determining leaks in fluid seals, such as seal connectors, blow out preventer (BOP) seals and high pressure energizable tube connectors, for use in an oil well or natural gas well.

BACKGROUND

A need exists for a system and method to quickly evaluate fluid seals that is capable of providing results in less than about 5 minutes.

A further need exists for a system and method for ascertaining small leaks, such as leaks of less than $1\times10^{-6} cm^3$.

A further need exists for a system and method for ascertaining leaks that is highly reliable, easy to use, and requires little or no training.

A further need exists for a leak test system and method for small volumes that can test at high pressures, such as over 10,000 psi, without requiring cumbersome testing equipment and calibration techniques.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present system and method in detail, it is to be understood that the system and method is not limited to the particular embodiments and that they can be practiced or carried out in various ways.

The present embodiments relate to a system and method for testing fluid seals, such as those in connectors or blow out preventers, which can be used for oil wells, natural gas well, subsea wells, land based wells, or the like.

The system and method can help the American economy by reducing the time and expense required to begin producing hydrocarbons, thereby lowering the cost of gasoline and similar petrochemical products, and saving rig time, which can be about $50,000 an hour. The system and method can save as much as 30 minutes per analysis. Analysis of a rig can be performed about 10 times a month; therefore the system and method can be used to save about 5 hours a month in analysis time. As such, the system and method can be used to save about $250,000 a month in production costs and about $500,000 a month in production time, based on current projected costs.

The method can include using a pump to simultaneously pump a fluid from a reservoir to a control device and a device for testing the device.

The pump can be a small hand pump, an ENERPAC pump, or any pump capable of flowing from about 1 milliliter to about 10 milliliters of gas or fluid into a test conduit and adapted to reach a test pressure ranging from about 1000 psi to about 20000 psi.

The pump can be an electric pump, and the electric pump can be connected to a power supply, such as batteries, a 110 volt power supply, generator, or combinations thereof.

The device and the control device can be pressurized. In one or more embodiments, the device and the control device can have similar pressures, identical pressures, or different pressures.

The method can include using a computer program to permit a user to test at two different pressures, and then to adjust the pressures to provide a "normal", thereby allowing for correct and highly accurate comparisons.

The method to determine leak rates for a fluid in a device can include determining a control volume for fluid in the control device at an initial pressure.

In one or more embodiments, the method can be provide highly accurate comparisons for fluid leak rates as low as $1\times10^{-6} cm^3$/minute or less.

The control volume can be expanded in the control device by allowing the control volume to increase in size by a known volume change, such that pressure changes from the initial pressure to an analysis pressure. The known volume change can range from only a few microliters to gallons.

The method can include inserting a valve in a flow line between the pump and the control device. The valve can have a stem that can be configured to be rotated to provide the known volume change. In operation, the expansion of the control volume can be achieved by turning the stem on the valve. For example, a quarter turn of the stem on the valve can correlate to a known volume change of $10^{-6}$ gallons.

The increase in volume can cause the pressure drop. An example of the change from initial pressure to analysis pressure for the control device can be 200 psi.

The method can include using a processor with a data storage which can have computer instructions stored therein. The data storage can be in communication with a pressure transducer on the device being tested and a pressure transducer on the control device.

Information on the fluid can be stored in the data storage. For example, the fluid can be water, oil, nitrogen, air, compressed air, compressed nitrogen, compressed helium, another compressed inert gas, another liquid, another gas, or combinations thereof. Also, the fluid can be at a pressure ranging from about 14 psi to about 40,000 psi.

Information on the test pressure can be stored in the data storage. For example, the test pressure can be 10,600 psi.

Information on the initial control pressure can be stored in the data storage. For example, the initial control pressure can be 10,325 psi.

Information on the analysis control pressure can be stored in the data storage. For example, the analysis control pressure can be 9,500 psi.

A value for the known volume change can be stored in the data storage. For example, the know volume change can range from about 1 milliliter to about 5 barrels.

Values representing the known volume change can be stored in the data storage. Values representing the known value change can vary depending upon the valve disposed between the pump and the control device, for example the value can range from about $1 \times 10^{-6}$ gallons to about 1 barrel.

The method can include simultaneously pressurizing the control device and the device that is being tested with fluid. The control device and the device can be pressurized at substantially similar initial pressures, such as within a deviation of +/−5 percent.

During pressurization, the fluid used to test the device can be substantially similar to, identical to, or different from the fluid used to apply pressure to the control device.

The method can include using computer instructions in the data storage to calculate a leak calculation ratio by: using the known volume change for the fluid in the control device, and dividing the known volume change by a difference between the initial pressure and the analysis pressure.

The method can include providing a determination that no leak is present in the fluid seal of the device being tested when the pressure of the device imitates the control pressure. For example, testing equipment can provide the determination that no leak is present.

The method can include calculating the difference between the pressure in the control device and the pressure in the device being tested over a defined period of time to form a calibration set point.

The method can include continually calculating the difference between the pressure in the control device and the pressure in the device being tested, and comparing the calculated difference to the calibration set point.

If the pressure of the device being tested does not imitate the pressure of the control device, then computer instructions in the data storage can be used to calculate the difference to form the calibration set point.

If the difference between the test response and the control response changes, then a leak volume can be calculated using the leak calculation ratio.

For example, if the control device is determined to be at 10,200 psi and the device being tested is determined to be at 10,000 psi, the initial difference will be 200 psi, which forms the calibration set point.

The method can include comparing the calculated initial difference over time. The method can include determining that a leak is present when the calculated difference deviates from the calibration set point. Computer instructions in the data storage can be used to compare the calculated difference over time and determine that there is a leak present.

The method can include multiplying the calculated calibration set point difference times the leak calculation ratio to determine a leak volume, such as by using computer instructions stored in the data storage.

The method can include dividing the leak volume by the defined period of time to provide a leak rate of the device being tested, such as by using computer instructions stored in the data storage.

In one or more embodiments, the method can include using a means for communicating with the data storage, such as a cell phone, laptop, or computer monitor. The means for communicating can link to computer instructions in the data storage for comparing the pressure of the device being tested to the pressure of the control device.

The control device can be tested using the fluid with a first test pressure ranging from about 5000 psi to about 20,000 psi, while simultaneously testing the device with the fluid at a test pressure ranging from about 5000 psi to about 20,000 psi.

A pressure of the control device can also be referred to as a control response, and a pressure of the device being tested, also referred to as a test response, can be simultaneously obtained. The pressure transducer on the control device can be used to measure and record the control response to the data storage, and the pressure transducer on the device being tested can be used to measure and record the test response to the data storage.

The test response and the control response can be compared, forming compared results which can be presented immediately from the time that the fluid is pumped to the control device and the device being tested.

The computer instructions in the data storage can form compared results, and can present the compared results to a user on the means for communicating. Also, the means for communicating can form the compared results. In one or more embodiments, the compared results can be formed immediately from the time of pumping the fluid to the device being tested and the control device.

The compared results can be presented to the user on a client device. The compared results can be transmitted to a network by the means for communicating, which can be in communication with the client device.

The client device can be a cell phone, laptop, desktop computer, personal digital assistant, global positioning system with a display and the processor, or similar device with the processor that can be connected to the network.

The network can be a cellular network, satellite network, local area network, global positioning system network, or the internet.

Figure 1:
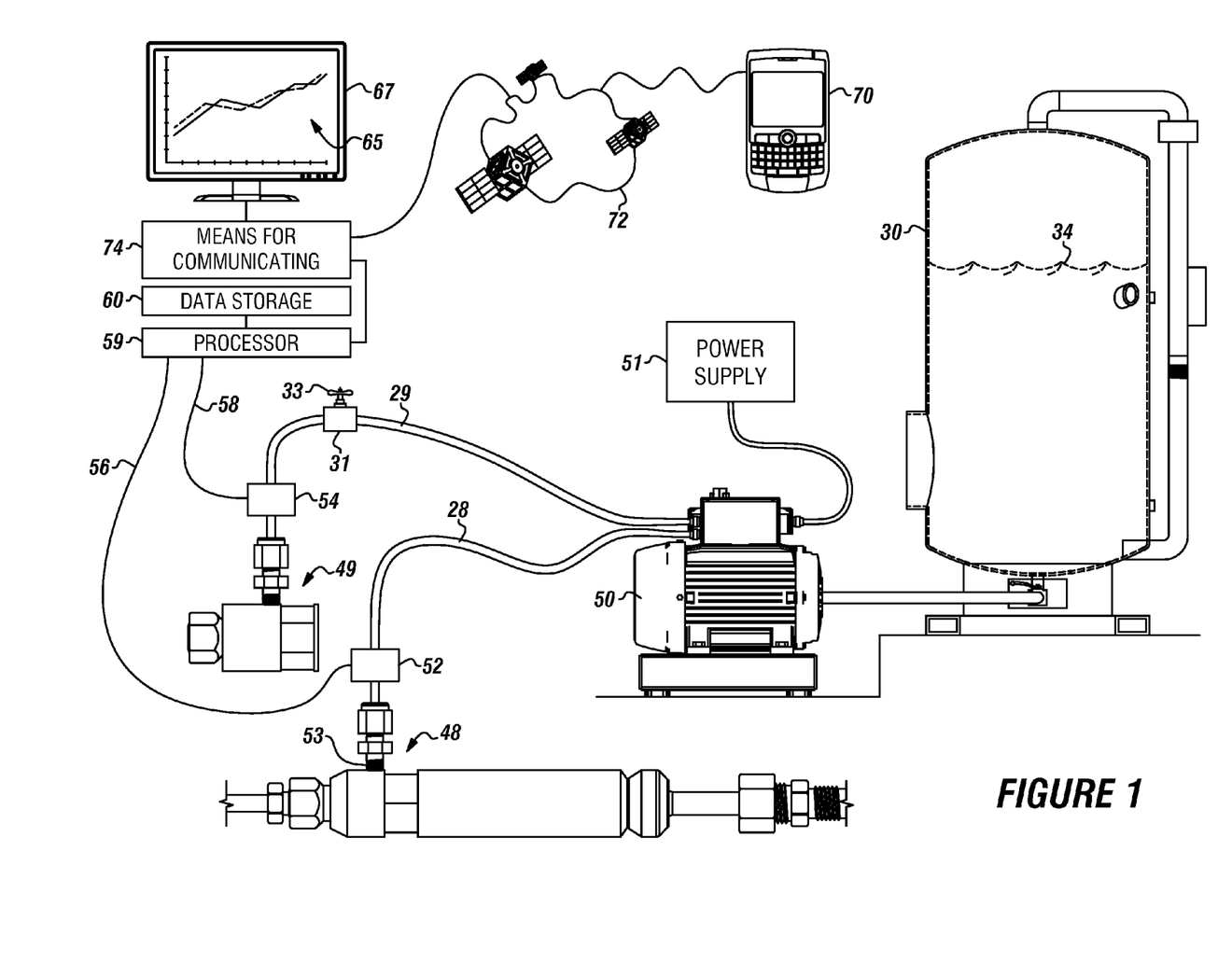
FIG. 1 depicts an embodiment of a system that can be used to implement the method.

Turning now to the Figures, FIG. 1 depicts a system that can be used to implement the method according to one or more embodiments.

The system can include a fluid 34 contained in a reservoir 30 or a secondary source.

The system can include a pump 50 that can be used to simultaneously pump the fluid 34 from the reservoir 30 to a device 48 being tested which can have a fluid seal, while pumping the fluid 34 from the reservoir 30 to a control device 49. The fluid 34 can be pumped at the same or similar pressures through flow lines, such as a test conduit 28 and a control conduit 29.

The pump 50 can be powered by a power supply 51, such as batteries, a 110 volt supply from a generator, or an additional power supply.

The system can include a valve 31 with an integral valve stem 33 that can be installed in the control conduit 29. For example, the valve 31 can be a ¼ inch high pressure stem valve, such as those available from Autoclave Engineers of Pennsylvania. The integral valve stem 33 can be configured to be rotated to provide known volume changes of the fluid 34 to the control device 49.

The pump 50 can pump the fluid 34 into the device 48 through a port 53. The pump 50 can pressure the device 48 to up to about 20,000 psi. In one or more embodiments, the device 48 can be a connector, blow out preventer or other device with a fluid seal.

The system can include a test pressure transducer 52 and control pressure transducer 54. The fluid 34 can pass through the test pressure transducer 52 in the test conduit 28 before passing into the device 48 and through the control pressure transducer 54 in the control conduit 29 before passing into the control device 49.

The test pressure transducer 52 can detect pressures in the test conduit 28, forming a test pressure signal 56. The test pressure transducer 52 can transmit the test pressure signal 56 to a processor 59 in communication with the test pressure transducer 52.

The control pressure transducer 54 can detect pressures in the control conduit 29, forming a control signal 58. The control pressure transducer 54 can transmit the control signal 58 to the processor 59 in communication with the control pressure transducer 54.

The processor 59 can be configured to receive the test pressure signal 56 and control signal 58 for storage in a data storage 60.

The processor 59 can store the test pressure signal 56 and the control signal 58 in the data storage 60.

The data storage 60 and the processor 59 can be in communication with a means for communicating 74, which can be in communication with a network 72 for communicating with a client device 70 for remote monitoring.

The means for communicating 74 can also be in communication with a display 67, which can depict an executive dashboard 65 of the testing results for local monitoring. In one or more embodiments, the executive dashboard 65 can also be presented on the client device 70.

Figure 2:
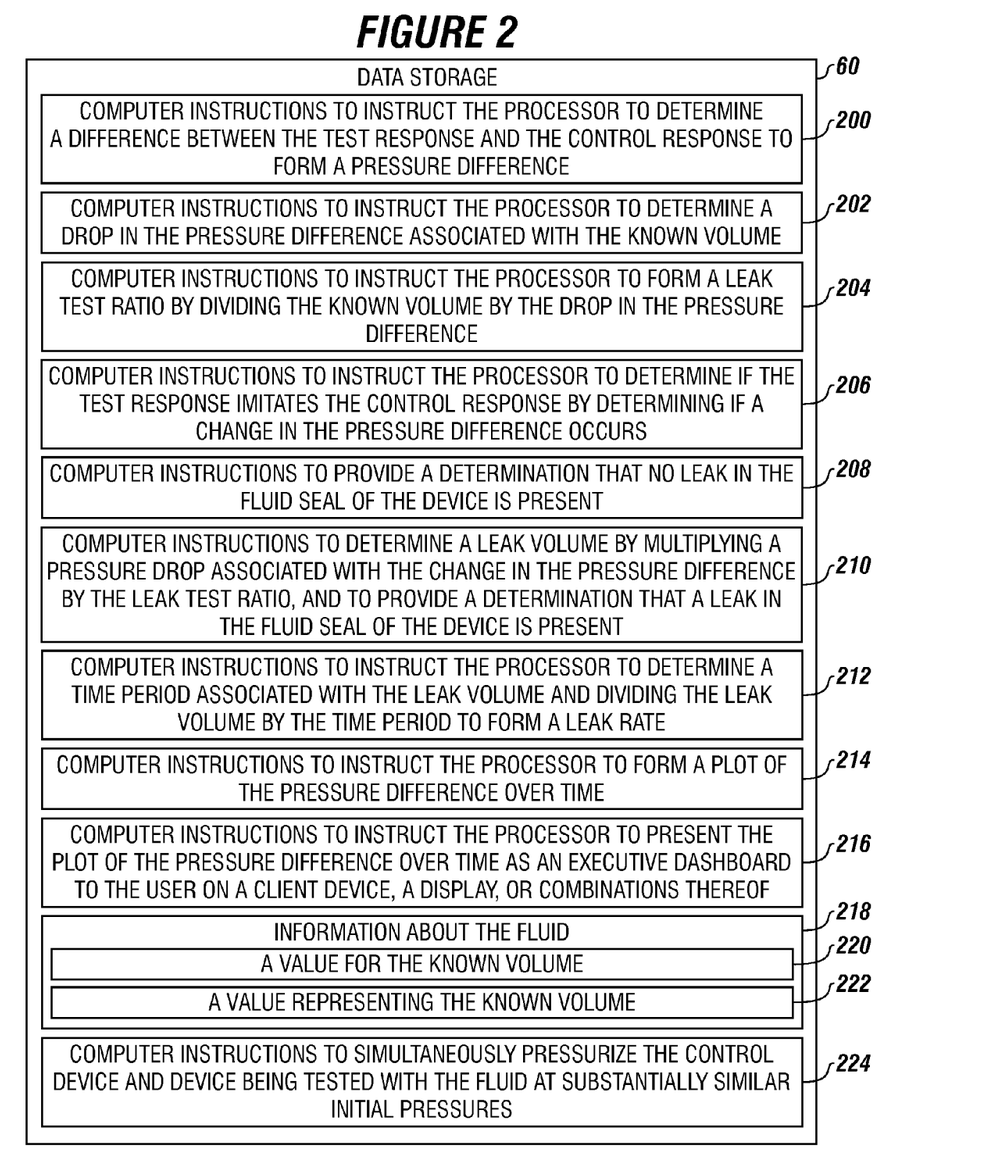
FIG. 2 depicts an embodiment of the data storage having a plurality of computer instructions stored therein.

FIG. 2 depicts an embodiment of the data storage 60 having a plurality of computer instructions stored therein.

The data storage 60 can include computer instructions to instruct the processor to determine a difference between the test response and the control response to form a pressure difference 200.

The data storage 60 can include computer instructions to instruct the processor to determine a drop in the pressure difference associated with the known volume 202.

The data storage 60 can include computer instructions to instruct the processor to form a leak test ratio by dividing the known volume by the drop in the pressure difference 204.

The data storage 60 can include computer instructions to instruct the processor to determine if the test response imitates the control response by determining if a change in the pressure difference occurs 206.

In operation, if imitation is determined, the processor can be configured to use computer instructions to provide a determination that no leak in the fluid seal of the device is present 208.

In operation, if imitation is not determined, the processor can be configured to use computer instructions to determine a leak volume by multiplying a pressure drop associated with the change in the pressure difference by the leak test ratio, and to provide a determination that a leak in the fluid seal of the device is present 210.

The data storage 60 can include computer instructions to instruct the processor to determine a time period associated with the leak volume and dividing the leak volume by the time period to form a leak rate 212.

The data storage 60 can include computer instructions to instruct the processor to form a plot of the pressure difference over time 214.

The data storage 60 can include computer instructions to instruct the processor to present the plot of the pressure difference over time as the executive dashboard to the user on the client device, the display, or combinations thereof 216.

The data storage 60 can include information about the fluid 218, a value for the known volume 220, and a value representing the known volume 222 stored therein.

The data storage 60 can include computer instructions to simultaneously pressurize the control device and device being tested with the fluid at substantially similar initial pressures 224.

For example, the initial pressures can be within a deviation of about +/−5 percent. During simultaneously pressurization, the fluid used to pressurize the device being tested and the fluid used to pressurize the control device can be identical, substantially similar, or different.

Figure 3:
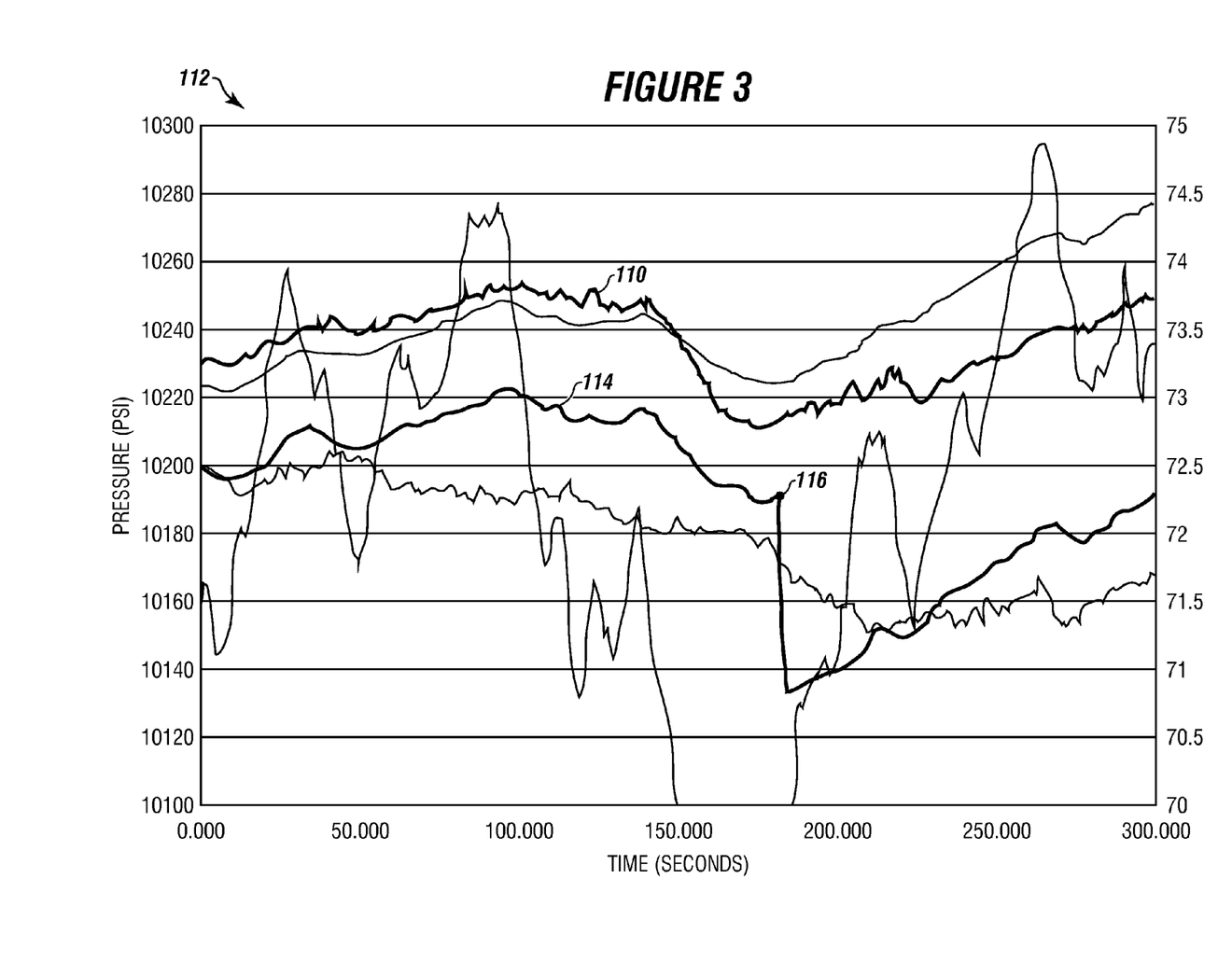
FIG. 3 depicts a raw pressure data plot, showing raw pressure data plotted over time, according to one or more embodiments.

FIG. 3 depicts a raw pressure data plot 112, showing raw pressure data plotted over time, according to one or more embodiments.

The raw pressure data plot 112 can include a plot of detected pressure of the device being tested as a test line 110.

The raw pressure data plot 112 can include a plot of detected pressure of the control device as a control line 114.

The control line 114 can have a pressure reduction at about halfway through a pressure test at a point 116, which can be due to a volume increase. The volume increase can be initiated by a ¼ inch turn on the stem of the valve in the control conduit. The diameter of the stem on the valve and the pitch of the thread connecting the stem to the valve can be known; therefore the volume increase can be calculated using computer instructions in the data storage.

The test line 110 can be depicted imitating the control line 114, which can indicate that there is no leak in the device being tested.

Figure 4:
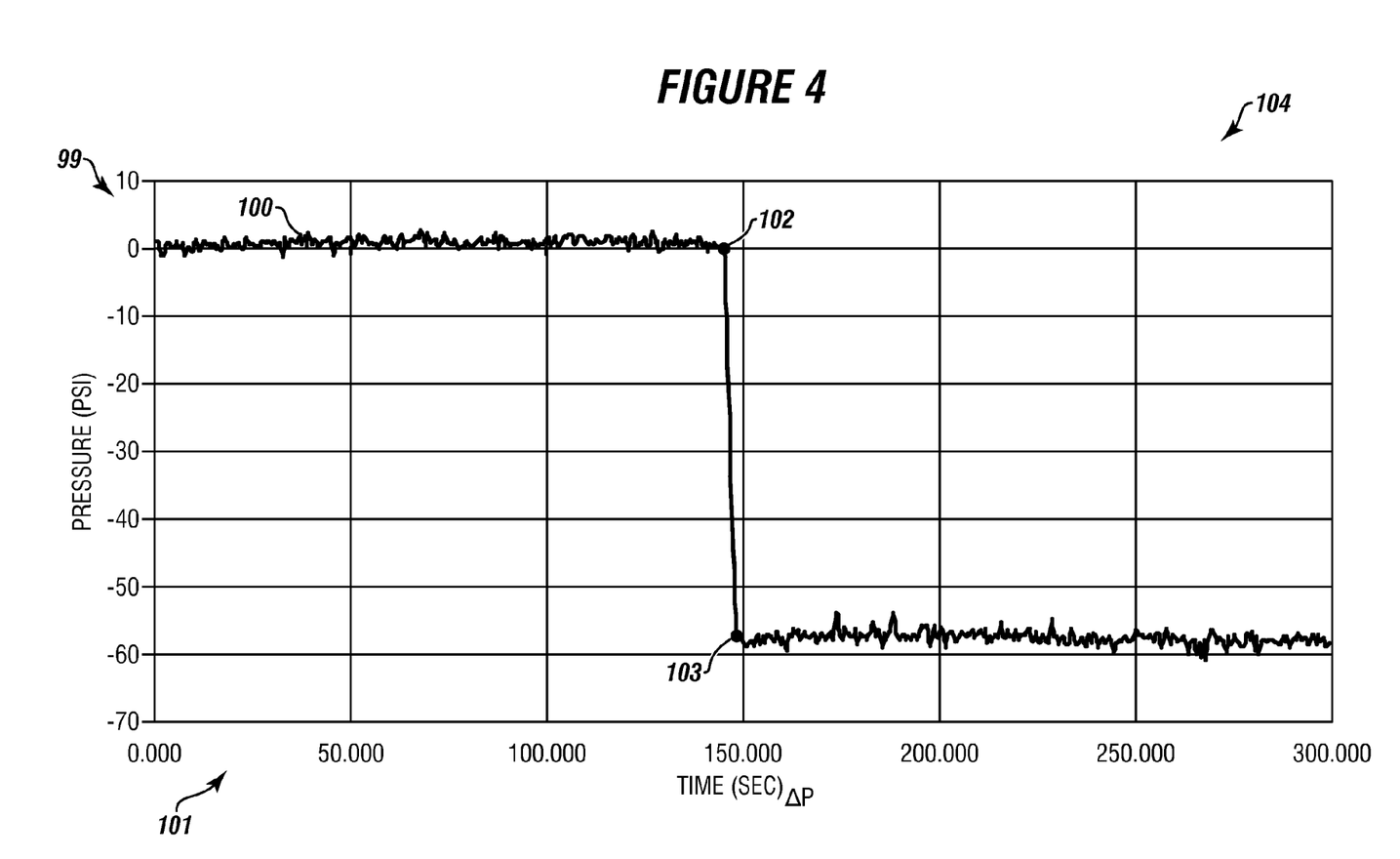
FIG. 4 depicts a plot of test response minus control response, according to one or more embodiments.

FIG. 4 depicts a plot of test response minus control response 104, according to one or more embodiments.

The plot of test response minus control response 104 can include a change in pressure 99 and a change in time 101. The change in pressure 99 can be plotted with respect to the change in time 101.

A first portion of the curve 100 represents a start of the test for fluid leaks, with the initial pressure of both being the same and remaining substantially the same until a midpoint of the curve 102, which can be about halfway through the test for fluid leaks. A ¼ inch turn of the stem of the valve in the control conduit can initiate the pressure difference depicted at the midpoint of the curve 102.

Turning the stem of the valve can open the valve and cause the fluid to flow through the valve, thereby increasing the volume of fluid in the control device. The difference in the volume of fluid before and after turning the stem of the valve can be referred to as a control volume.

The control volume can be calculated based on the valve stem diameter and valve stem thread pitch. For example, the control volume can be $1 \times 10^{-6}$ gallons, which can result in a pressure difference of 60 psi, which is indicated at a pressure drop point of the curve 103.

In one or more embodiments, the plot of test response minus control response 104 can be formed using computer instructions stored in the data storage.

The plot of test response minus control response 104 can make evident whether or not there is a fluid leak in the fluid seal of the device being tested.

The plot of test response minus control response 104 is depicted with no leak present, which is evident due to the lack of a change in pressure difference except for at the midpoint of the curve 102 where a ¼ inch turn of the stem of the valve in the control conduit was initiated.

Figure 5:
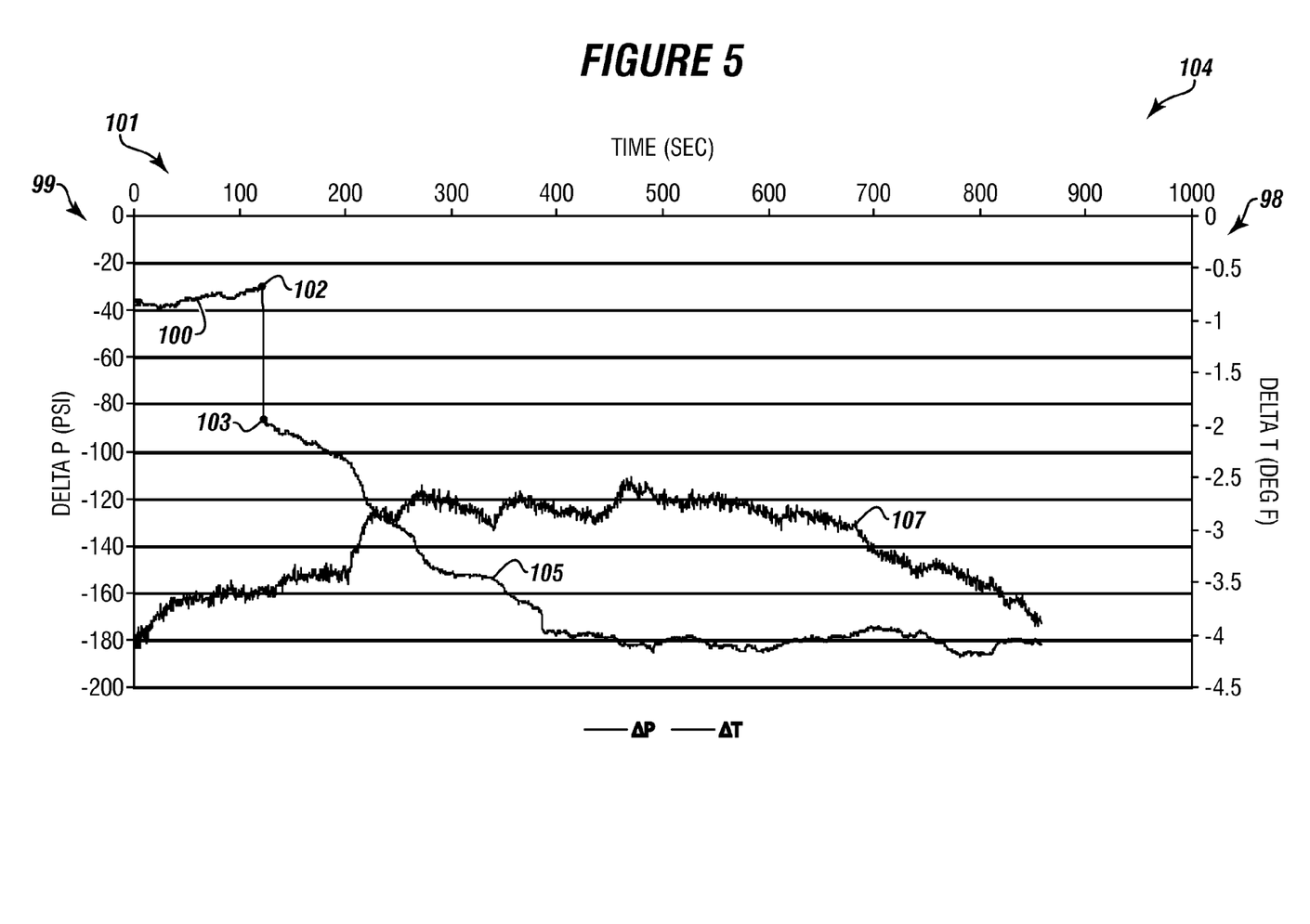
FIG. 5 depicts an embodiment of the plot of test response minus control response with the change in pressure and a change in temperature plotted with respect to the change in time.

FIG. 5 depicts an embodiment of the plot of test response minus control response 104 with the change in pressure 99 and a change in temperature 98 plotted with respect to the change in time 101.

The first portion of the curve 100 represents a start of the test for fluid leaks, with the initial pressure of both remaining substantially the same until the midpoint of the curve 102, at which a ¼ inch turn of the stem of the valve in the control conduit has been initiated to cause the depicted pressure difference.

Turning the stem of the valve in the control conduit can cause the change in pressure to drop to the pressure drop point of the curve 103.

After the pressure drop point of the curve 103, the change in pressure 99 can be shown dropping slowly over the change in time 101, as indicated by a leak portion of the curve 105, which is indicative of a fluid leak in the fluid seal of the device being tested.

In operation, the known volume change can be introduced halfway through the test, allowing a leak rate to be defined.

The leak rate can be calculated using the change in volume and the change in time in which the change in volume occurred can be determined, such as by using computer instructions in the data storage. For example, a $1\times10^{-6}$ gallon reduction in volume over five minutes can be equated with a leak rate of 0.00029 gallons per day.

In the depicted embodiment, a ¼ inch turn of the stem of the valve was initiated at about 150 seconds into the test, and he fluid leaking stopped at about 400 seconds into the test. The leak volume can be estimated. For example, if 60 psi is a known leak volume of $1\times10^{-6}$ gallons, and the actual leak volume is 90 psi over about 250 second, it can be estimated that the leak rate is about 0.00045 gallons per day.

Environmental effects, such as weather, O-ring extrusion, and the like can be cancelled out because the difference between the test response and the control response is measured. Also, the control device can be visually inspected for fluid leaks to ensure accurate test results. As such, deviations on the plot of test response minus control response 104 can be determined to be due to leaks, unless the control device is not in under the same environmental conditions as the device being tested.

A temperature line 107 for the change in temperature 98 can be plotted along with the change in pressure 99. In operation, if the change in temperature 98 rises and the change in pressure 99 rises, this can be indicative that the device being tested is being heated relative to the control device. If the change in temperature 98 rises and the change in pressure 99 drops, this can be indicative of a fluid leak in the device being tested.

In operation, multiple devices can be stacked or connected together, such that multiple fluid seals can be tested simultaneously. For example, a ⅜ inch and two ¼ inch connections can be tested by screwing together the connectors.

Figure 6:
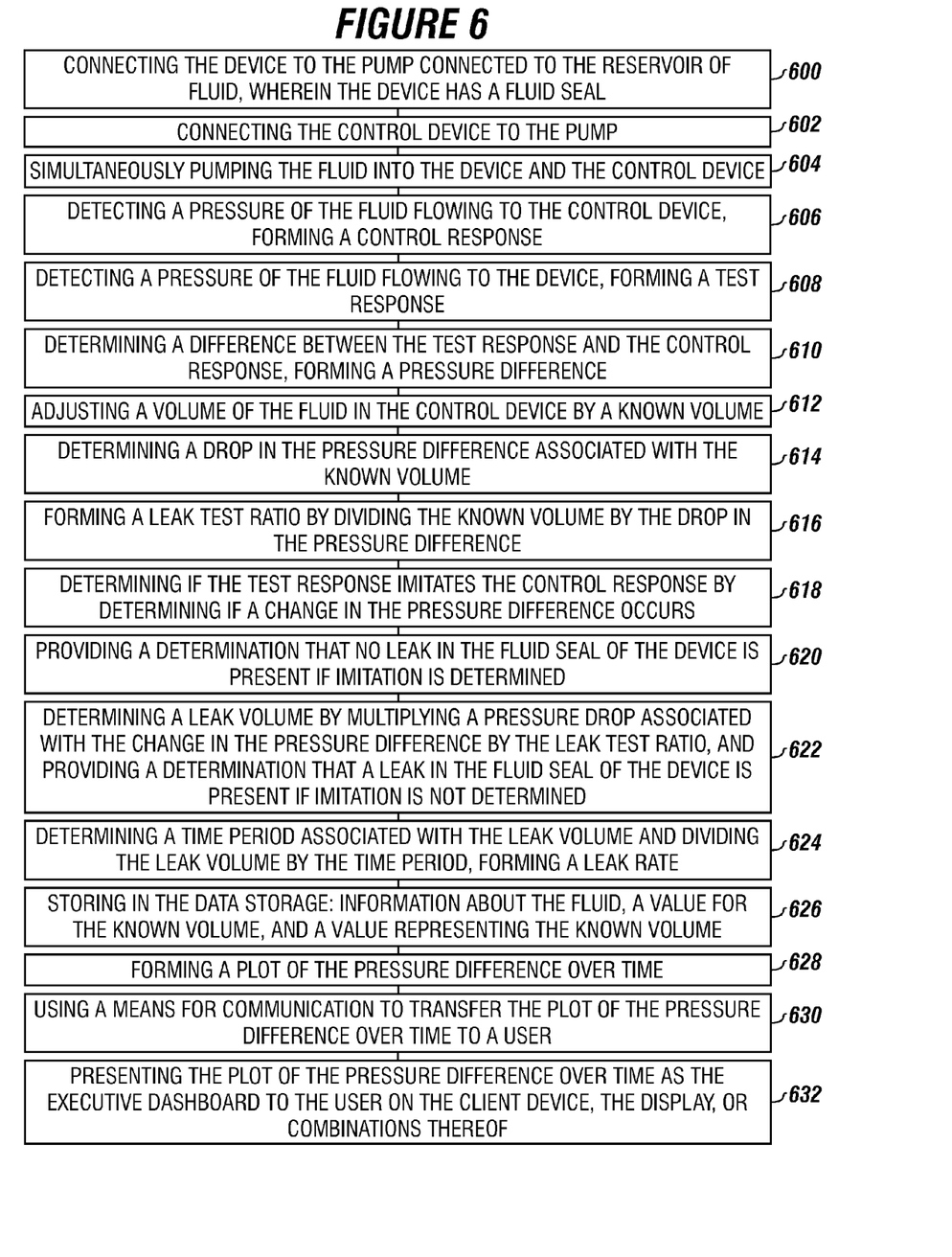
FIG. 6 depicts a flow diagram of the method for testing the device for a fluid leak, according to one or more embodiments.

FIG. 6 depicts a flow diagram of the method for testing the device for a fluid leak, according to one or more embodiments. The fluid leak can have a rate of less than $1\times10^{-6}$ cm$^3$ per minute.

The method can include connecting the device to the pump connected to the reservoir of fluid, wherein the device has a fluid seal, as illustrated by box 600.

The device can be a blowout preventer, a connector, a plurality of connectors, or multiple devices stacked or connected together for a well. Multiple devices can be simultaneously tested.

For example, the fluid can be: water, compressed air, oil, compressed nitrogen, compressed helium, another compressed inert gas, another gas, another fluid, and combinations thereof. The fluid can be at a pressure ranging from 14 psi to 40,000 psi.

The method can include connecting the control device to the pump, as illustrated by box 602.

The method can include simultaneously pumping the fluid into the device and the control device, as illustrated by box 604.

The fluid can be pumped to the device and the control device at a pressure ranging from 5000 psi to 20,000 psi. In operation, identical pressures can be provided to the device and the control device using the fluid.

The method can include detecting a pressure of the fluid flowing to the control device, forming a control response, as illustrated by box 606.

The method can include detecting a pressure of the fluid flowing to the device, forming a test response, as illustrated by box 608.

For example, the pressures can be detected using pressure transducers in communication with the processor, the processor can be in communication with the data storage, and the data storage can have computer instructions for storing the detected pressures.

For example, computer instructions in the data storage can be used to form the test response and the control response.

The method can include determining a difference between the test response and the control response, forming a pressure difference, as illustrated by box 610.

For example, computer instructions in the data storage can be used to form the pressure difference.

The method can include adjusting a volume of the fluid in the control device by a known volume, as illustrated by box 612.

For example, the volume of the fluid in the control device can be adjusted using a stem of the valve. The valve can be in fluid communication between the pump and the control device, and the stem can be configured to be rotated to provide the known volume. The known volume can range from about $1\times10^{-6}$ gallons to about 1 barrel.

The method can include determining a drop in the pressure difference associated with the known volume, as illustrated by box 614.

For example, computer instructions in the data storage can be used to determine the drop in the pressure difference associated with the known volume.

The method can include forming a leak test ratio by dividing the known volume by the drop in the pressure difference, as illustrated by box 616.

For example, computer instructions in the data storage can be used to form the leak test ratio.

The method can include determining if the test response imitates the control response by determining if a change in the pressure difference occurs, as illustrated by box 618.

For example, computer instructions in the data storage can be used to determine if the test response imitates the control response.

The method can include providing a determination that no leak in the fluid seal of the device is present if imitation is determined, as illustrated by box 620.

The method can include determining a leak volume by multiplying a pressure drop associated with the change in the pressure difference by the leak test ratio, and providing a determination that a leak in the fluid seal of the device is present if imitation is not determined, as illustrated by box 622.

For example, computer instructions in the data storage can be used to provide the determination that no leak in the fluid seal of the device is present, or determine the leak volume and provide the determination that the leak in the fluid seal of the device is present.

The method can include determining a time period associated with the leak volume and dividing the leak volume by the time period, forming a leak rate, as illustrated by box 624.

The method can include storing in the data storage: information about the fluid, a value for the known volume, and a value representing the known volume, as illustrated by box 626.

For example, the value representing the known volume can be a degree of turn associated with a known volume.

The method can include forming a plot of the pressure difference over time, as illustrated by box 628.

The method can include using a means for communication to transfer the plot of the pressure difference over time to a user, as illustrated by box 630.

For example, the means for communication can be in communication with the processor, the data storage, or combinations thereof.

The method can include presenting the plot of the pressure difference over time as the executive dashboard to the user on the client device, the display, or combinations thereof, as illustrated by box 632.

For example, the client device and the display can each be: a cell phone, a laptop, a desktop computer, a personal digital assistant, a global positioning system, or similar device that is connectable to the network.

While these embodiments have been described with emphasis on the embodiments, it should be understood that within the scope of the appended claims, the embodiments might be practiced other than as specifically described herein.

What is claimed is:

1. A method for testing a device for a fluid leak, the method comprising:
   a. connecting the device to a pump connected to a reservoir of fluid, wherein the device has a fluid seal;
   b. connecting a control device to the pump;
   c. simultaneously pumping the fluid into the device and the control device;
   d. detecting a pressure of the fluid flowing to the control device, forming a control response;
   e. detecting a pressure of the fluid flowing to the device, forming a test response;
   f. determining a difference between the test response and the control response, forming a pressure difference;
   g. adjusting a volume of the fluid in the control device by a known volume;
   h. determining a drop in the pressure difference associated with the known volume;
   i. forming a leak test ratio by dividing the known volume by the drop in the pressure difference; and
   j. determining if the test response imitates the control response by determining if a change in the pressure difference occurs, wherein:
      (i) if imitation is determined, providing a determination that no leak in the fluid seal of the device is present; or
      (ii) if imitation is not determined, determining a leak volume by multiplying a pressure drop associated with the change in the pressure difference by the leak test ratio, and providing a determination that a leak in the fluid seal of the device is present.

2. The method of claim 1, further comprising determining a time period associated with the leak volume and dividing the leak volume by the time period, forming a leak rate.

3. The method of claim 1, wherein the volume of the fluid in the control device is adjusted using a stem of a valve, wherein the valve is in fluid communication between the pump and the control device, and wherein the stem is configured to be rotated to provide the known volume.

4. The method of claim 1, further comprising detecting the pressures using pressure transducers, wherein the pressure transducers are in communication with a processor, wherein the processor is in communication with a data storage, and wherein the data storage has computer instructions for storing the detected pressures.

5. The method of claim 4, further comprising using computer instructions in the data storage to:
   a. form the test response and the control response;
   b. form the pressure difference;
   c. determine the drop in the pressure difference associated with the known volume;
   d. form the leak test ratio;
   e. determine if the test response imitates the control response;
   f. provide the determination that no leak in the fluid seal of the device is present, or determining the leak volume and provide the determination that the leak in the fluid seal of the device is present;
   g. store information about the fluid in the data storage;
   h. store a value for the known volume in the data storage; and
   i. store a value representing the known volume in the data storage.

6. The method of claim 1, further comprising forming a plot of the pressure difference over time.

7. The method of claim 6, further comprising:
   a. using a means for communication to transfer the plot of the pressure difference over time to a user, wherein the means for communication is in communication with the processor, the data storage, or combinations thereof;
   b. presenting the plot of the pressure difference over time as an executive dashboard to the user on a client device, a display, or combinations thereof; or
   c. combinations thereof.

8. The method of claim 1, wherein:
   a. the fluid is a member of the group consisting of: water, compressed air, oil, compressed nitrogen, compressed helium, another compressed inert gas, another gas, another fluid, and combinations thereof;
   b. the fluid is at a pressure ranging from 14 psi to 40,000 psi;
   c. the fluid is pumped to the device and the control device at a pressure ranging from 5000 psi to 20,000 psi or
   d. combinations thereof.

9. The method of claim 1, further comprising providing identical pressures to the device and the control device using the fluid.

10. The method of claim 1, wherein the device is a blowout preventer, a connector, or a plurality of connectors for a well.

11. The method of claim 1, wherein the fluid leak has a rate of less than $1 \times 10^{-6}$ cm$^3$ per minute.

12. The method of claim 1, wherein the known volume ranges from 1×10-6 gallons to 1 barrel.

13. The method of claim 1, further comprising stacking or connecting multiple devices together and simultaneously fluid seals of the multiple devices.

14. A system for testing a device for a fluid leak, the system comprising:
   a. a pump connected to a reservoir of fluid, wherein the pump is configured to be connected to a device having a fluid seal;
   b. a control device in fluid communication with the pump, wherein the pump is configured to simultaneously pump the fluid into the device and the control device;
   c. a first pressure transducer disposed between the pump and the control device for detecting a pressure of the fluid in the control device to form a control response;
   d. a second pressure transducer disposed between the pump and the device for detecting a pressure of the fluid in the device form a test response;
   e. a processor and a data storage in communication with the first pressure transducer and the second pressure transducer, wherein the processor is configured to receive the a control response and the test response for storage in the data storage;
   f. computer instructions in the data storage to instruct the processor to determine a difference between the test response and the control response to form a pressure difference;
   g. a valve in fluid communication between the pump and the control device, wherein the valve comprises a stem configured to adjust a volume of the fluid in the control device by a known volume;
   h. computer instructions in the data storage to instruct the processor to determine a drop in the pressure difference associated with the known volume;
   i. computer instructions in the data storage to instruct the processor to form a leak test ratio by dividing the known volume by the drop in the pressure difference; and
   j. computer instructions in the data storage to instruct the processor to determine if the test response imitates the control response by determining if a change in the pressure difference occurs, wherein:
      (i) if imitation is determined, the processor is configured to use computer instructions in the data storage to provide a determination that no leak in the fluid seal of the device is present; or
      (ii) if imitation is not determined, the processor is configured to use computer instructions in the data storage to determine a leak volume by multiplying a pressure drop associated with the change in the pressure difference by the leak test ratio, and to provide a determination that a leak in the fluid seal of the device is present.

15. The system of claim 14, further comprising computer instructions in the data storage to instruct the processor to determine a time period associated with the leak volume and dividing the leak volume by the time period to form a leak rate.

16. The system of claim 14, further comprising in the data storage:
   a. information about the fluid;
   b. a value for the known volume; and
   c. a value representing the known volume.

17. The system of claim 14, further comprising computer instructions in the data storage to instruct the processor to form a plot of the pressure difference over time.

18. The system of claim 17, further comprising:
   a. a means for communication in communication with the processor and the data storage for transferring the plot of the pressure difference over time to a user;
   b. computer instructions in the data storage to instruct the processor to present the plot of the pressure difference over time as an executive dashboard to the user on a client device, a display, or combinations thereof; or
   c. combinations thereof.

19. The system of claim 14, wherein:
   a. the fluid is a member of the group consisting of: water, compressed air, oil, compressed nitrogen, compressed helium, another compressed inert gas, another gas, another fluid, and combinations thereof;
   b. the fluid is at a pressure ranging from 14 psi to 40,000 psi; or
   c. combinations thereof.

20. The system of claim 14, wherein the device is a blowout preventer, a connector, a plurality of connectors, or multiple devices stacked or connected for a well.

* * * * *